United States Patent
Hoyer et al.

(10) Patent No.: US 10,675,996 B2
(45) Date of Patent: Jun. 9, 2020

(54) VEHICLE SEAT EASY-ENTRY SYSTEM

(71) Applicant: Lear Corporation, Southfield, MI (US)

(72) Inventors: Uwe Hoyer, Oberding (DE); Thomas Matzka, Oberding (DE); Mikel Inge Yarto Elorza, Oberding (DE)

(73) Assignee: Lear Corporation, Southfield, MI (US)

( * ) Notice: Subject to any disclaimer, the term of this patent is extended or adjusted under 35 U.S.C. 154(b) by 162 days.

(21) Appl. No.: 15/801,670

(22) Filed: Nov. 2, 2017

(65) Prior Publication Data
US 2018/0201163 A1   Jul. 19, 2018

(30) Foreign Application Priority Data

Jan. 17, 2017   (DE) .................. 10 2017 200 646

(51) Int. Cl.
*B60N 2/20*   (2006.01)
*B60N 2/12*   (2006.01)

(52) U.S. Cl.
CPC .............. *B60N 2/20* (2013.01); *B60N 2/12* (2013.01)

(58) Field of Classification Search
CPC ... B60N 2/10; B60N 2/12; B60N 2/20; B60N 3/023
See application file for complete search history.

(56) References Cited

U.S. PATENT DOCUMENTS

| | | | |
|---|---|---|---|
| 5,683,140 A | 11/1997 | Roth et al. | |
| 5,700,055 A | 12/1997 | Davidson et al. | |
| 6,336,679 B1 | 1/2002 | Smuk | |
| 8,282,150 B2 | 10/2012 | Clor et al. | |
| 8,313,147 B2* | 11/2012 | Scheurer | B60N 2/3013 297/378.12 |
| 8,474,911 B2* | 7/2013 | Parker | B60N 2/12 297/311 |
| 8,585,145 B2* | 11/2013 | Nock | B60N 2/12 297/331 |

(Continued)

FOREIGN PATENT DOCUMENTS

| | | |
|---|---|---|
| CN | 102056764 A | 5/2011 |
| CN | 105522941 A | 4/2016 |

(Continued)

OTHER PUBLICATIONS

Office Action for German Application No. 10 2017 200 646.3, dated Mar. 3, 2018, 11 pages.

(Continued)

*Primary Examiner* — David R Dunn
*Assistant Examiner* — Christopher E Veraa
(74) *Attorney, Agent, or Firm* — Brooks Kushman P.C.

(57) ABSTRACT

An easy-entry release system is utilized to actuate an easy-entry recliner of a vehicle seat assembly configured to fold a seat back relative to a seat bottom. The easy-entry release system includes a support member connectable to a seat back, a lever pivotally attached to the support member, and a sled in contact with the support member and moveable relative to the support member between a first position and a second position along a linear path. The sled is connected to the lever such that the lever rotates relative to the support member in response to the sled moving between the first and second positions. A strap is connected to the sled such that actuation of the strap moves the sled between the first and second positions.

17 Claims, 3 Drawing Sheets

(56) References Cited

U.S. PATENT DOCUMENTS

| | | | |
|---|---|---|---|
| 8,845,027 B2 | 9/2014 | Nock et al. | |
| 8,960,783 B2 | 2/2015 | Holder et al. | |
| 9,308,835 B2 | 4/2016 | Schukalski | |
| 2006/0249972 A1* | 11/2006 | Lutzka | B60N 2/01583 296/65.03 |
| 2011/0074189 A1* | 3/2011 | Sawada | B60N 2/20 297/216.1 |
| 2013/0161993 A1* | 6/2013 | Otsuka | B60N 2/22 297/354.12 |
| 2014/0110986 A1* | 4/2014 | Yamaguchi | B60N 2/68 297/378.1 |
| 2014/0191553 A1 | 7/2014 | Blendea et al. | |
| 2015/0266402 A1* | 9/2015 | Lutzka | B60N 2/3009 297/61 |
| 2015/0336478 A1* | 11/2015 | Mitsuhashi | B60N 2/22 296/65.09 |
| 2015/0375643 A1* | 12/2015 | Fisher | B60N 2/015 297/334 |
| 2016/0257224 A1 | 9/2016 | Pluta et al. | |

FOREIGN PATENT DOCUMENTS

| | | |
|---|---|---|
| CN | 105966272 A | 9/2016 |
| DE | 10027585 A1 | 12/2001 |
| DE | 102006001901 B4 | 2/2010 |
| DE | 102011082070 A1 | 3/2013 |
| DE | 102013103640 A1 | 10/2014 |
| WO | 2015055467 A1 | 4/2015 |

OTHER PUBLICATIONS

Office Action re Chinese Patent Application No. 2017110769362.2 dated Dec. 18, 2019.

* cited by examiner

VEHICLE SEAT EASY-ENTRY SYSTEM

CROSS-REFERENCE TO RELATED APPLICATIONS

This application claims the priority to DE application Serial No. 10 2017 200 646.3 filed Jan. 17, 2017, the disclosure of which is hereby incorporated in its entirety by reference herein.

TECHNICAL FIELD

This disclosure relates to an easy-entry system for pivoting a vehicle seat to a fold-forward position.

BACKGROUND

Vehicles include one or more seat assemblies for supporting occupants. The seat assemblies may include a seat back and a seat bottom that are pivotal with respect to each other. Some vehicle seats include an easy-entry mechanism that actuates the seat to a fold-forward position allowing greater access to a rear seating area of the vehicle.

SUMMARY

According to one embodiment, a vehicle seat assembly includes a seat bottom and a seat back pivotally attached to the seat bottom. An easy-entry recliner is configured to permit the seat back to pivot relative to the seat bottom when released. A release system is configured to release the easy-entry recliner and includes a support member supported on the seat back. A lever of the release system is pivotally attached to the support member. A sled is in contact with the support member and is moveable relative to the support member between a first position and a second position. The sled is connected to the lever such that the lever rotates in response to the sled moving between the first and second positions. A tension member has a first end connected to the lever and a second end connected to the easy-entry recliner. The easy-entry recliner is disengaged in response to pivoting of the lever.

According to another embodiment, a vehicle seat assembly includes a seat bottom, a seat back pivotally attached to the seat bottom, and an easy-entry recliner configured to permit the seat back to pivot relative to the seat bottom when released. An easy-entry release system of the seat assembly is configured to release the seat back from the seat bottom allowing the seat back to be pivoted to an easy-entry position. The release system includes a support member located on the seat back and a lever pivotally attached to the support member and operably connected to the easy-entry recliner. A strap is connected to the lever such that actuation of the strap pivots the lever relative to the support member to disengage the easy-entry recliner allowing the seat to be moved to an easy-entry position.

According to yet another embodiment, an easy-entry release system is disclosed. The easy-entry release system is utilized to actuate an easy-entry recliner of a vehicle seat assembly that is configured to fold a seat back relative to a seat bottom. The easy-entry release system includes a support member connectable to a seat back, a lever pivotally attached to the support member, and a sled in contact with the support member and moveable relative to the support member between a first position and a second position along a linear path. The sled is connected to the lever such that the lever rotates relative to the support member in response to the sled moving between the first and second positions. A strap is connected to the sled such that actuation of the strap moves the sled between the first and second positions.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
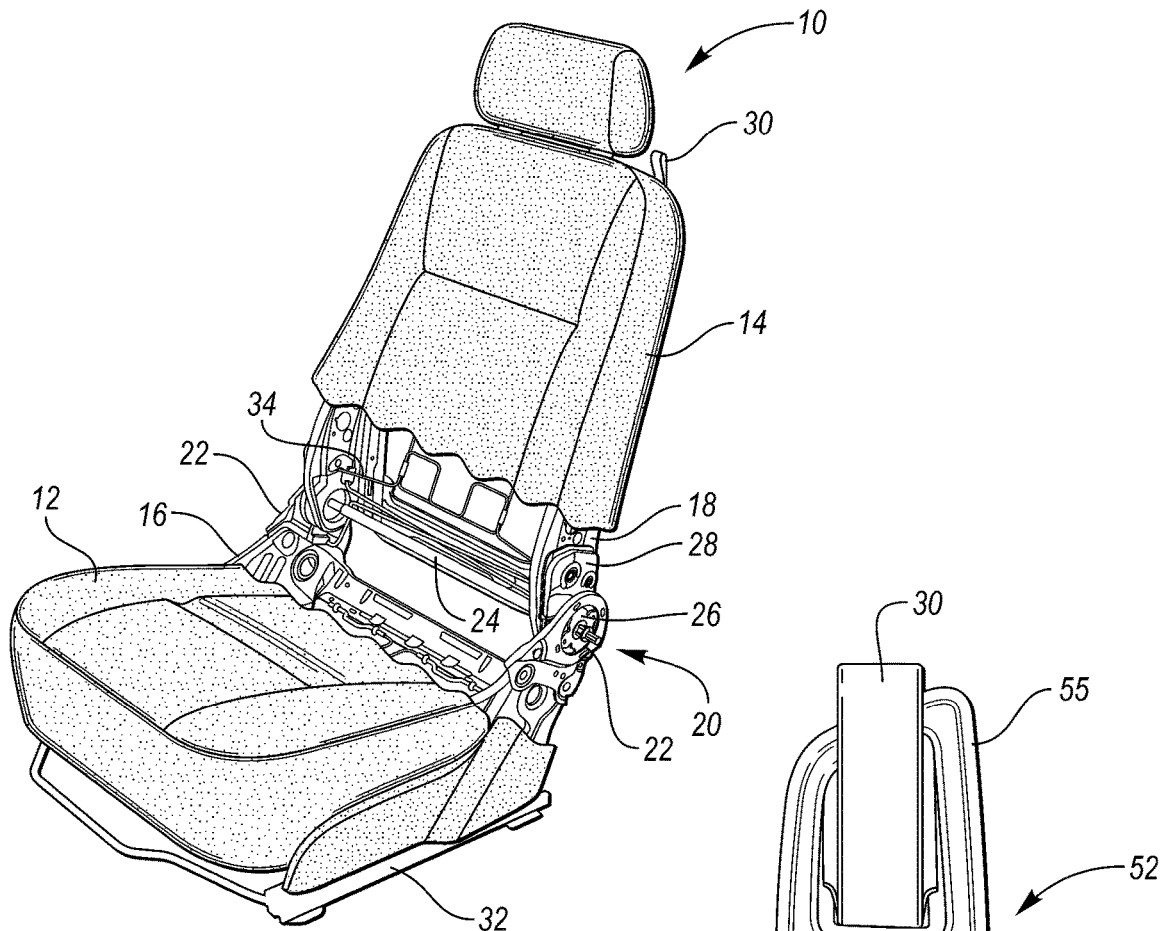
FIG. 1 is a cutaway perspective view of a seat assembly having an easy-entry system.

Referring to FIG. 1, an exemplary seat assembly 10 is shown. The seat assembly 10 may be configured for use in a vehicle, such as a car, sport utility vehicle, or pickup truck. The seat assembly 10 may include a seat bottom 12 and a seat back 14. The seat bottom 12 may be mounted on a support surface, such as a floor pan of a vehicle. At least one track assembly 32 may be coupled to the seat bottom 12 to facilitate fore and aft positioning of the seat assembly 10. The seat back 14 may be pivotally disposed on the seat bottom 12 as will be described in more detail below. In FIG. 1, the seat back 14 is shown in a seating position, which may include a range of tilt positions between a generally upright position and a fully reclined position.

The seat bottom 12 and the seat back 14 may each include structural frames having any suitable configuration. In at least one embodiment, the seat bottom frame may include side members 16 disposed opposite each other and one or more cross members (not shown) that extend between the side members. Similarly, the seat back frame may include side members 18 disposed opposite each other and one or more cross members (not shown) that extend between the side members.

A recliner assembly 20 may pivotally connect the seat back 14 to the seat bottom 12. The angle of inclination (i.e., tilt) of the seat back 14 may be adjusted in response to user input. The recliner assembly 20 may include one recliner 22 or a pair of recliners 22, sometimes referred to as discontinuous recliners, operatively coupled to one another via a torque rod 24. The torque rod 24 may interconnect the recliners 22 to synchronize their operation. The recliners 22 may have similar configurations. For example, the recliners 22 may generally be mirror images of each other. The recliner assembly 20 may be either manually or electrically driven as is known to those of ordinary skill in the art.

Each of the recliners 22 may include a first mounting bracket connected to a corresponding side member 16, a second mounting bracket connected to a corresponding side member 18, and a recliner heart 26. The recliner heart 26 is configured to control pivotal movement of the seat back 14 relative to the seat bottom 12 in a manner known by those skilled in the art. Applicant's U.S. Pat. No. 8,657,377, the disclosure of which is hereby incorporated in its entirety by reference herein, describes an example recliner mechanism of this type.

In another embodiment, the recliners 22 may each include a gear plate attached to one of the seat bottom 12 and the seat back 14, a guide plate attached to the other of the seat bottom 12 and the seat back 14, and one or more locking elements configured to lock the gear plate to the guide plate to hold the seat back 14 relative to the seat bottom 12 when engaged and to allow relative rotation between the guide plate and the gear plate when disengaged to allow the seat back to be tilted between a range of seating positions. Applicant's U.S. Pat. No. 8,845,027, the disclosure of which is hereby incorporated in its entirety by reference herein, describes an example recliner mechanism of this type.

The seat assembly 10 includes an easy-entry function, which refers to the ability of the seat assembly 10 or components thereof to move forward to an easy-entry position (sometimes referred to as a fold-forward position) when actuated. Moving the seat 10 to the easy-entry position provides greater clearance or access to an area located behind the seat assembly 10. The easy-entry function may include forward pivoting of the seat back 14 relative to the seat bottom 12, forward sliding of the seat assembly 10 relative to the floor pan, or both.

Figure 2:
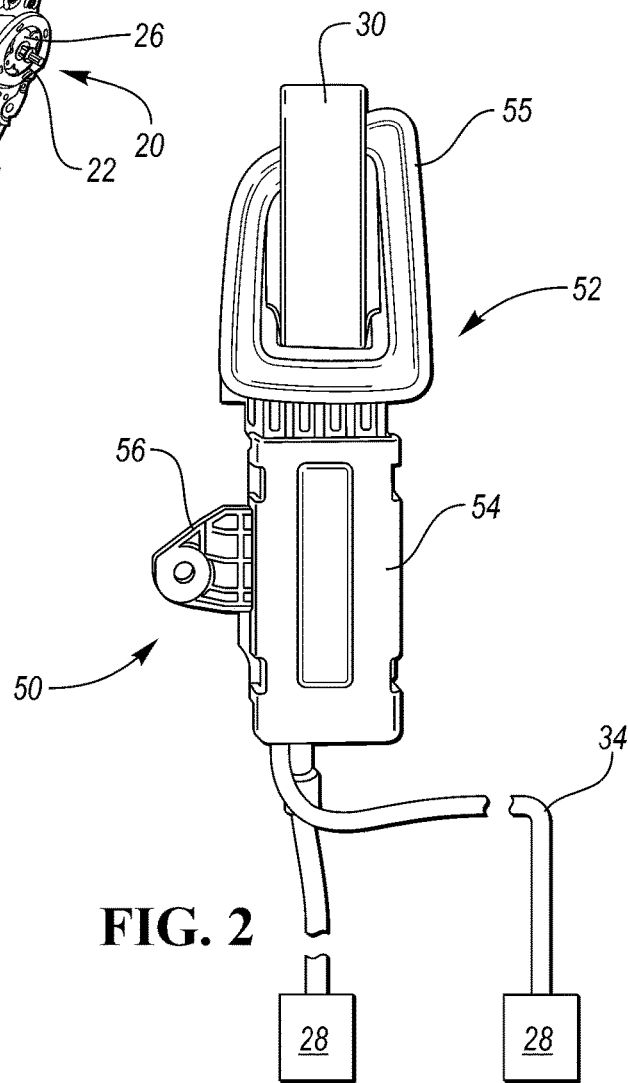
FIG. 2 is a diagrammatical view of the easy-entry system.

Referring to FIGS. 1 and 2, an easy-entry system 50 controls the easy-entry functionality of the seat assembly 10. The easy-entry system 50 includes one or more easy-entry recliners 28, sometimes referred to as continuous recliners, and a release system 52 according to the disclosure for releasing the one or more easy-entry recliners 28. When released, the easy-entry recliners 28 decouple the seat back 14 from the seat bottom 12 to allow forward pivoting of the seat back 14 to the easy-entry position.

In one or more embodiments, each easy-entry recliner 28 may include a back plate fixed to the seat back and a memory plate fixed to the recliner heart 26. A locking mechanism is configured to lock and release the plates relative to each other. Actuation of the release system 52 releases the locking mechanism to decouple the back plate and the memory plate allowing the seat back 14 to pivot to the easy-entry position. The locking mechanism may be biased to the engaged position by a spring or other resilient member. Applicant's U.S. Pat. No. 8,657,377 describes an example easy-entry recliner of this type.

In one or more other embodiments, each easy-entry recliner 28 may include a sector plate, a mounting plate, and a locking mechanism configured to lock and release the plates relative to each other. The mounting plate may be mounted to the side member 18 and the sector plate may be fixed to the recliner 22. Applicant's U.S. Pat. No. 8,845,027 describes an example easy-entry recliner of this type. Actuation of the easy-entry release system 52 releases the locking mechanism to decouple the sector plate and the mounting plate allowing the seat back 14 to pivot to the easy-entry position. The locking mechanism may be biased to the engaged position by a spring or other resilient member. Alternatively, the easy-entry recliner may have any suitable configuration.

Actuation of the release system 52 may also cause the seat 10 to slide forward along the track assembly 32 to provide further clearance behind the seat 10. A slave cable may be connected between a track release mechanism and one of the recliners 22, 28. An example seat-track release system is disclosed in Applicant's U.S. Pat. No. 8,845,027.

The easy-entry release system 52 includes a release member 30 such as a strap (as illustrated) a handle, a lever, a button, or any other suitable element and a release assembly 53 actuated by the strap 30. One or more Bowden cables 34, or other tension members, operably connect the release assembly 53 to the one or more easy-entry recliners 28. When the strap 30 of the system 52 is pulled, the release assembly 53 actuates placing tension on the cable 34 causing the easy-entry recliner 28 to release. The release assembly 53 may include a simple machine, such as a lever, to gain mechanical advantage reducing the pulling force required to disengage the easy-entry recliner 28.

The release assembly 53 may include a support member 54 disposed within the seat back 14 near an upper portion of the seat back. A backside of the seat back 14 may define an opening that the support member 54 and/or the strap 30 extend through. A bezel 55 surrounds the opening and defines a slot that the strap 30 extends through. The support member 54 may include one or more brackets 56 that are connected to the seat frame or other structural member of the seat back 14.

Figure 3:
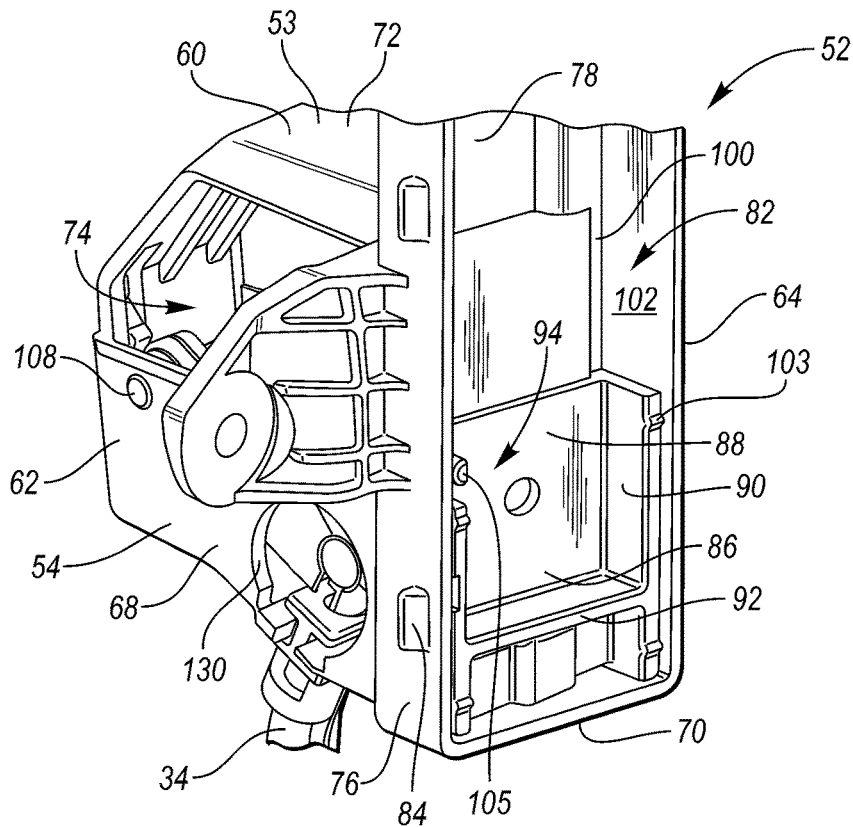
FIG. 3 is a rear perspective view of a release assembly of the easy-entry system with a strap and back cover omitted for illustrative purposes.
Figure 4:
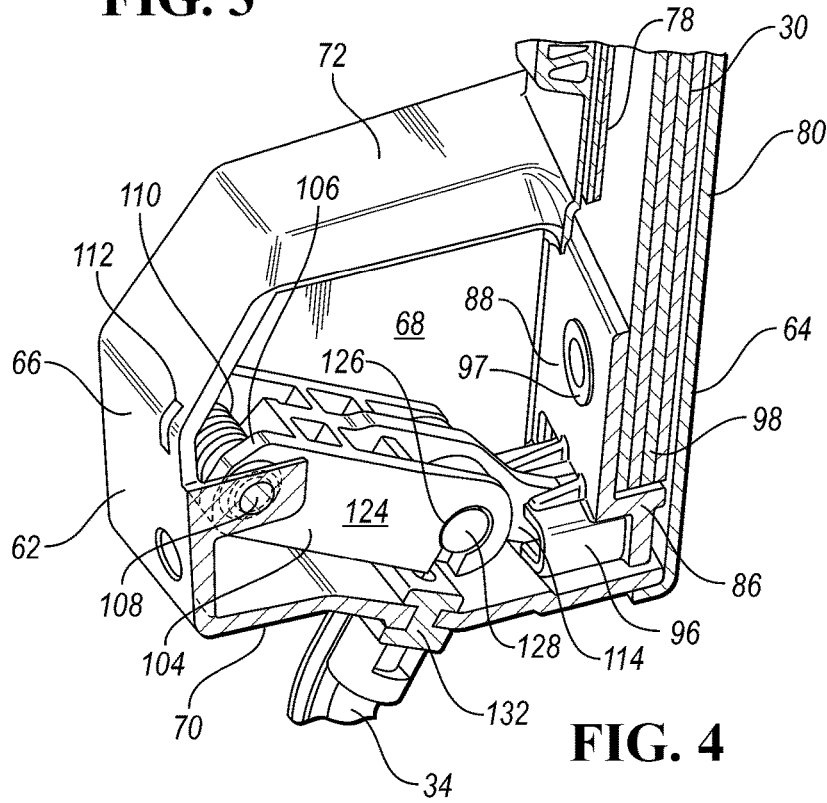
FIG. 4 is a side cross-sectional view of the release assembly.
Figure 5:
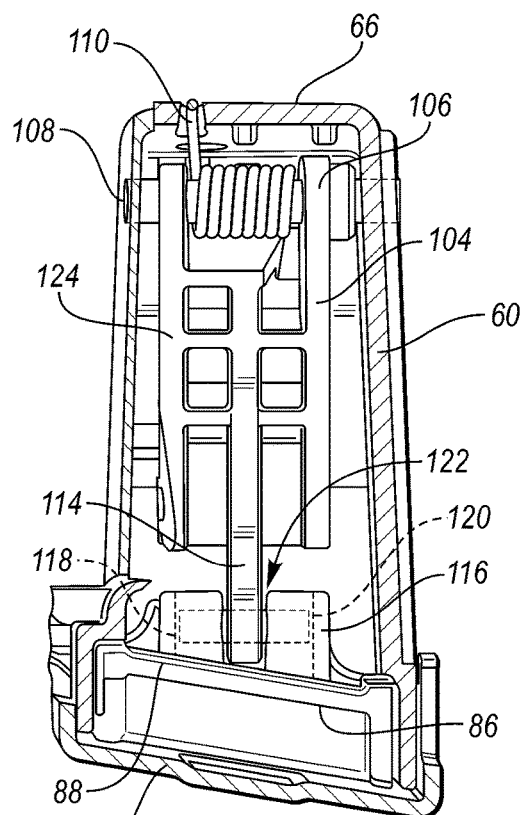
FIG. 5 is a top cross-sectional view of the release assembly with the strap omitted for illustrative purposes.

Referring to FIGS. 3, 4, and 5, in one or more embodiments, the support member 54 is a housing 60. The housing 60 may generally include a front portion 62 and a back portion 64. The front portion 62 may include a front wall 66, a pair of opposing sidewalls 68, a bottom wall 70, and a top wall 72 that cooperate to define a lever chamber 74. The back portion 64 may include a vertical wall 78 and opposing sidewalls 76 that cooperate with the bottom wall 70 to define a sled chamber 82. A back cover 80 may be removably attached to the housing 60 to close the sled chamber 82. The sidewalls 76 may include features 84 that connect with features on the cover 80 to secure the cover 80 to the housing 60.

A sled 86 is disposed within the sled chamber 82 and is slidable relative to the housing 60 along a linear path that may be in a generally up-and-down direction. The sled 86 may include a front wall 88, sidewalls 90, and an intermediate wall 92 that cooperate to define a strap receiving area 94. A non-looped end 98 of the strap 30 is received within the area 94. A fastener, such as rivet 97, secures the sled 86 to the strap 30. The strap 30 could also be secured to the sled 86 by adhesive or other attachment means known in the art.

The vertical wall 78 defines guide surfaces 100 and the sidewalls 76 define guide surfaces 102 that engage with the front wall 88 and the sidewalls 90 of the sled 86, respectively, to guide the sled 86 when moving between its various positions. The sled 86 may include one or more raised contact points such as contact points 103 and 105 that engage with corresponding engagement surfaces. The raised contact points reduce friction between the sled 86 and the housing 60. Contact point 105 may be flexible to account for size variations and imperfections in housing 60 and the sled 86. The sled 86 and the sled chamber 82 are sized to reduce left-and-right and front-to-back movement of the sled 86 relative to the housing 60. The housing 60 and the sled 58 may be formed of plastic, metal, composite, or any other suitable material. In one or more embodiments, the housing 60, the sled 86, or both are formed of plastic formulated to have lubricating properties to facilitate sliding of the sled 86 within the sled chamber 82. An example suitable plastic is polyoxymethylene.

The release assembly 53 may include a lever 104 disposed with the lever chamber 74. The lever 104 provides mechanical advantage to reduce the pulling force required to actuate the easy-entry system 50. The lever 104 includes a front portion 106 that is pivotally connected to the sidewalls 68. For example a pin 108 may extend through the sidewalls and the lever to pivotally attach the lever 104 to the sidewalls 68. A spring 110 biases the lever 104 to the position shown in FIG. 4. One end of the spring 110 is received within a spring aperture 112 defined in the front wall 66 and the other end of the spring 110 is connected to the lever 104.

Figure 6:
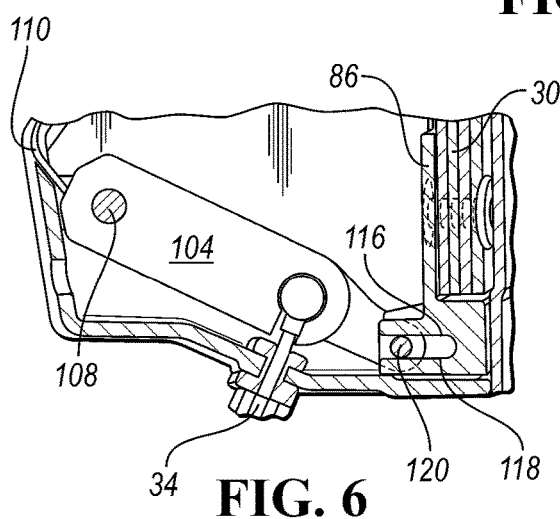
FIG. 6 is a partial side cross-sectional view of the release assembly showing a lever in a first position.

Referring to FIGS. 4, 5, and 6, a second or rear portion 114 of the lever 104 is connected to a lever-receiving portion 96 of the sled 86. The lever-receiving portion 96 may include a pair of arms 116 that project forwardly from the front wall 88. Each of the arms 116 defines a slot 118 elongated in a generally front-to-back direction. A pin 120 of the lever 104 is received within the slots 118 allowing relative movement between the lever 104 and the sled 86 in the elongated direction of the slots 118. Relative movement is required because the front-to-back position of the pin 120 varies along its arcuate pivot path when the lever 104 is pivoted relative to the housing 60. The arms 116 are spaced apart to define a gap 122. The rear portion 114 of the lever 104 is narrower than the other portions of the lever and is sized to fit within the gap 122.

In an alternative embodiment, the lever may have a wider rear portion having spaced sidewalls that define a gap. A lever pin spans the gap and connects between the sidewalls. The sled includes an arm sized to fit within the gap between the sidewalls. The arm defines a slot that receives the pin.

The lever 104 also includes a middle portion 124 located between the front portion 106 and the rear portion 114. The cable 34 may be connected to the lever 104 at the middle portion 124. For example, the middle portion 124 may define a slot 126 that receives a head 128 of the cable 34 to connect the cable 34 to the lever 104. One of the sidewalls 68 may define a cutout 130 (FIG. 3) allowing the cable 34 to be connected and disconnected from the lever 104 while the lever is installed in the housing 60. The bottom wall 70 may define a slot that allows the cable to extend into the housing and connect with the lever. The cable 34 may include a grommet 132 that connects the sheathing of the cable 34 to the housing 60.

Figure 7:
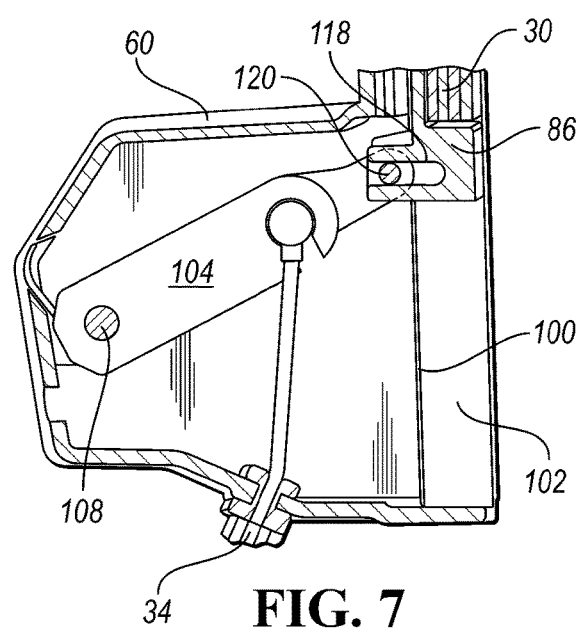
FIG. 7 is a partial side cross-sectional view of the release assembly showing the lever in a second position.

Referring to FIGS. 6 and 7, the lever 104 is pivotable relative to the housing 60 between a first position (FIG. 6), a second position (FIG. 7), and a range of intermediate positions. The first position may be a resting position and the lever 104 may be biased to the resting position by the spring 110 and/or the cable 34 unless acted upon by an external force, such a user pulling the strap 30. The second position may be a fully actuated position.

The lever 104 is pivoted about the pin 108 from the first position to the second position in response to the strap 30 being pulled upwardly. The sled 86 is attached to the strap 30 and slides upwardly along the guide surfaces 100, 102 when the strap is pulled. Upward movement of the sled 86 causes the lever 104 to pivot about the pin 108 producing tension on the cable 34 and causing the cable 34 to release the easy-entry recliner 28 so that the seat back 14 may pivot with respect to the seat bottom 12. The seat assembly 10 may include other mechanisms, such as one or more cables and biasing members, that move the seat 10 to the easy-entry position in response to disengagement of the easy-entry recliner 28.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A vehicle seat assembly comprising:
a seat bottom;
a seat back pivotally attached to the seat bottom;
an easy-entry recliner configured to permit the seat back to pivot relative to the seat bottom when released; and
a release system configured to release the easy-entry recliner, the release system including:
a support member supported on the seat back,
a lever pivotally attached to the support member,
a release member at least a portion of which is disposed outside of the seat back,
a sled disposed within the seat back and in contact with the support member and moveable relative to the support member between a first position and a second position upon actuation of the release member, wherein the sled is connected to the lever such that the lever rotates in response to the sled moving between the first and second positions, and
a tension member having a first end connected to the lever and a second end connected to the easy-entry recliner, wherein the easy-entry recliner is disengaged in response to pivoting of the lever, and wherein the support member is a housing defining a lever chamber and a sled chamber, and the lever is pivotally disposed in the lever chamber and the sled is slidably disposed within the sled chamber.

2. The vehicle seat assembly of claim 1, wherein the lever is connected to the support member at a first location and is connected to the sled at a second location that is spaced apart from the first location, wherein the first end of the tension member is connected to the lever between the first and second locations.

3. The vehicle seat assembly of claim 1, wherein the release member includes a strap having an end portion connected to the sled and disposed within the seat back and a looped portion extending out of the seat back.

4. The vehicle seat assembly of claim 1, wherein the sled defines a slot and a portion of the lever is disposed within the slot such that the lever slides within the slot when the lever is pivoted.

5. The vehicle seat assembly of claim 4, wherein the sled defines a pair of arms that cooperate to define the slot and are spaced apart to define a gap, wherein a portion of the lever extends through the gap.

6. The vehicle seat assembly of claim 1, wherein the housing includes a bottom wall defining an opening, and the tension member extends through the opening to connect to the lever.

7. The vehicle seat assembly of claim 6, wherein the sled is located adjacent the bottom wall when in the first position and is vertically spaced from the bottom wall when in the second position, wherein the sled is biased to the first position.

8. The vehicle seat assembly of claim 7, wherein the release system further includes a resilient member connected between the housing and the lever and urging the lever to pivot towards the bottom wall to urge the sled to the first position.

9. The vehicle seat assembly of claim 1 further comprising a discontinuous recliner configured to adjust a tilt of the seat back relative to the seat bottom, wherein a portion of the easy-entry recliner is fixed to a portion of the discontinuous recliner.

10. A vehicle seat assembly comprising:
a seat bottom;
a seat back pivotally attached to the seat bottom; an easy-entry recliner configured to permit the seat back to pivot relative to the seat bottom when released; and
an easy-entry release system configured to release the seat back from the seat bottom allowing the seat back to be pivoted to an easy-entry position, the release system including:
a support member located on the seat back,
a lever pivotally attached to the support member and operably connected to the easy-entry recliner,
a strap connected to the lever such that actuation of the strap pivots the lever relative to the support member to disengage the easy-entry recliner allowing the seat to be moved to the easy-entry position, and
a sled in contact with the support member and moveable relative to the support member between a first position and a second position, wherein the sled is connected to the strap and connected to the lever such that the lever rotates in response to the sled moving between the first and second positions, and
wherein the support member is a housing defining a lever chamber and a sled chamber, and the lever is pivotally disposed in the lever chamber and the sled is slidably disposed within the sled chamber.

11. The vehicle seat assembly of claim 10, wherein the sled defines a slot and a portion of the lever is disposed within the slot, wherein the lever and the sled are arranged such that the lever slides within the slot when the lever is pivoted.

12. The vehicle seat assembly of claim 10, wherein the release system further includes a tension member having a first end connected to the easy-entry recliner and a second end connected to the lever.

13. The vehicle seat assembly of claim 12, wherein the lever is connected to the support member at a first location, operably connected to the strap at a second location, and connected to the second end of the tension member at a third location that is located between the first and second locations.

14. An easy-entry release system for actuating an easy-entry recliner of a vehicle seat assembly that is configured to fold a seat back relative to a seat bottom, the easy-entry release system comprising:
a support member connectable to a seat back;
a lever pivotally attached to the support member;
a sled in contact with the support member and moveable relative to the support member between a first position and a second position along a linear path, the sled defining a slot and a gap intersecting the slot, and wherein the sled is connected to the lever such that one portion of the lever is movably disposed within the slot and another portion of the lever is movably disposed within the gap, and the lever rotates relative to the support member in response to the sled moving between the first and second positions; and
a release member connected to the sled such that actuation of the release member moves the sled between the first and second positions.

15. The easy-entry release system of claim 14, wherein the lever is pivotable about an axis that is spaced apart from the linear path.

16. The easy-entry release system of claim 14, wherein the support member is a housing defining a lever chamber and a sled chamber, and the lever is pivotally disposed in the lever chamber and the sled is slidably disposed within the sled chamber.

17. The easy-entry release system of claim 16, wherein the housing defines guide surfaces in contact with the sled, the guide surfaces being disposed between the lever chamber and the sled chamber and extending substantially parallel to the linear path.

* * * * *